US007385510B2

(12) United States Patent
Childress et al.

(10) Patent No.: US 7,385,510 B2
(45) Date of Patent: Jun. 10, 2008

(54) CONTAINER MANIFEST INTEGRITY MAINTENANCE SYSTEM AND METHOD

(75) Inventors: Rhonda L. Childress, Austin, TX (US); Bradley Childs, Austin, TX (US); Joann Huffman, Austin, TX (US); Stewart Jason Hyman, Richmond Hill (CA); David Bruce Kumhyr, Austin, TX (US); Stehen James Watt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 11/427,969

(22) Filed: Jun. 30, 2006

(65) Prior Publication Data

US 2008/0001746 A1 Jan. 3, 2008

(51) Int. Cl.
*G08B 13/14* (2006.01)
(52) U.S. Cl. .............................. 340/572.1; 340/572.19; 340/572.8; 340/572.9; 340/10.1; 340/505; 705/28; 235/462.22
(58) Field of Classification Search .. 340/572.1–572.9, 340/10.1, 505; 705/28; 235/462.22
See application file for complete search history.

(56) References Cited

U.S. PATENT DOCUMENTS

| 6,236,911 | B1 * | 5/2001 | Kruger ........................... 701/1 |
|---|---|---|---|
| 6,661,339 | B2 | 12/2003 | Muirhead |
| 6,681,990 | B2 | 1/2004 | Vogler et al. |
| 6,943,678 | B2 | 9/2005 | Muirhead |
| 7,336,175 | B2 * | 2/2008 | Howarth et al. .......... 340/572.1 |
| 7,342,497 | B2 * | 3/2008 | Chung et al. ............ 340/572.1 |
| 2002/0030597 | A1 | 3/2002 | Muirhead |
| 2002/0196126 | A1 | 12/2002 | Eisenberg |
| 2003/0174099 | A1 | 9/2003 | Bauer et al. |
| 2004/0069850 | A1 | 4/2004 | De Wilde |
| 2005/0134433 | A1 | 6/2005 | Sweeney, II |
| 2005/0237184 | A1 | 10/2005 | Muirhead |
| 2005/0241548 | A1 | 11/2005 | Muirhead |
| 2005/0258955 | A1 | 11/2005 | Gloekler |
| 2005/0258961 | A1 * | 11/2005 | Kimball et al. .......... 340/572.1 |
| 2006/0054693 | A1 | 3/2006 | Kawai |
| 2006/0212165 | A1 | 9/2006 | Watanabe |
| 2006/0243174 | A1 | 11/2006 | Muirhead |
| 2007/0013519 | A1 * | 1/2007 | Chung et al. ............ 340/572.1 |
| 2007/0137531 | A1 | 6/2007 | Muirhead |
| 2007/0156491 | A1 | 7/2007 | Schuler et al. |
| 2007/0171080 | A1 | 7/2007 | Muirhead |
| 2007/0176755 | A1 | 8/2007 | Fischer et al. |
| 2007/0295822 | A1 | 12/2007 | Kawai |

* cited by examiner

*Primary Examiner*—Phung T Nguyen
(74) *Attorney, Agent, or Firm*—Robert H. Frantz; David A. Mims, Jr.

(57) ABSTRACT

A system, method, and medium for tracking the contents of a container in which the items stored in the container are provided with radio frequency identification ("RFID") tags, and a tracker affixed to the container periodically polls the items in the container to collect identification information. An electronic manifest, also attached to the container, is updated periodically to reflect items which have been added to the container or removed from the container since the last polling. The tracker emulates an RFID tag when polled by an external reader, responding by uploading the entire electronic manifest to the external reader. The external reader and the affixed reader preferably utilize distinct RFID protocols so as to produce a hierarchical manifest data structure with high integrity.

17 Claims, 18 Drawing Sheets

CONTAINER MANIFEST INTEGRITY MAINTENANCE SYSTEM AND METHOD

BACKGROUND OF THE INVENTION

1. Field of the Invention

This invention pertains to technologies employed in tracking and control of contents of containers on assembly lines, and during warehouse handling and shipment, and particularly to technologies employing Radio Frequency Identification ("RFID") tags.

2. Background of the Invention

Radio Frequency Identification ("RFID") systems are becoming more and more popular for monitoring and tracking objects, animals, and sometimes even people. For example, RFID systems are used in stores for monitoring and tracking items for sale, in libraries for tracking books, in warehouses for tracking goods, on farms for monitoring cattle or livestock herds, and in roadway tolling systems for tracking passing vehicles. As the costs of manufacturing RFID components continue to decrease and the technology associated with RFID components improves, people are finding more and more applications in which to employ RFID technologies. Additionally, people are continually improving the technology and finding ways to circumvent performance limitations associated with RFID systems.

RFID systems typically consist of radio frequency ("RF") tags, RF tag readers, and some type of computer running software to process information obtained from tag reads, or interrogations. The tags typically respond to an RF query, or interrogation, signal broadcast initiated by the tag reader. The tags usually send out pre-configured information, such as serial numbers or other data stored within differing types of memory devices coupled to the tags. RFID tags and tag readers usually operate without any line-of-sight requirements. The tags and readers can usually also receive and transmit signals through nonconductive materials.

Turning to FIG. 5, RFID-based systems various embodiments may use wireless radio signals (53) to identify objects. In one of its most elemental forms an RFID system (50) may comprise two components, an RFID tag (51) and an RFID reader (52). RFID tags for various embodiments, which may be referred to as RFID cards or RFID transponders, may exist in many shapes and sizes. Generally, they may contain one or more coils to serve as an antenna (54), and a radio transceiver (55) contained on a silicon microchip. The coiled antenna may also be used to induce power from the reader (52) to the tag so that the tag is not required to have its own power source. The microchip may also store information (56), such as a unique identification number for identifying the object to which the tag is attached. Some RFID tags may allow a reader to update or change the information stored in the tag.

RFID tags in various embodiments may be classified as passive or active. Passive tags may generally not broadcast any information stored within the tag until activated by an RFID reader. Active tags, on the other hand, may constantly broadcast identification or information stored on the microchip. These active tags may contain batteries (57). The batteries may provide additional power for transmitting from the transceiver and operating the microchip. The batteries may allow the tags to send their data greater distances than passive tags.

RFID readers may have the same basic components as RFID tags, including an antenna (54') and reader electronics including an RF transceiver (55') and a processor-based computer circuit (58). The reader may also serve as a programmer for tags which can be re-programmed, or tags which are being initially programmed. Many readers, and especially those involved in inventory control or loss prevention, also interconnect to a network (59), such as a local area network or a wireless LAN, in order to communicate with inventory systems, point-of-sale terminals, etc.

To illustrate a basic RFID inventory control function, FIG. 6 shows a product package (60), such as a carton, box, blister pack, or bottle, in two positions (a) and (b) relative to a reader, such as a point-of-sale system (63) or a hand-held reader (52'). The product is configured with an RFID tag (51), which is often located within the package just behind a barcode or Universal Price Code ("UPC") printed on the outside of the package (60). Some RFID devices, however, are more cleverly hidden within the product to prevent tampering.

As the package (60) is moved (62) within RF range (53, 53') of a reader, the reader transmits a code which activates the tag (51), and the tag responds by transmitting one or more codes back to the reader. In current standardized technologies, frequencies used fall into low frequency ("LF") and high-frequency ("HF") ranges, 30 KHz to 500 KHz, and 850 MHz to 950 MHz or 2.4 GHz to 2.5 GHz, respectively. LF systems have a reader range of approximately 6 feet, while HF systems may provide a reader range of 90 feet or more. One organization, EPCglobal Incorp., provides open industry standards for such RFID technologies to insure compatibility between tags and readers. These standards include formats of the data and codes used for activation, programming, and identification. Identification codes usually include identifiers. For example, EPC Tag Data Standard Version 1.1 rev 1.27 specifies encoding schemes for a serialized version of the EAN.UCC Global Trade Item Number ("GTIN")™, the EAN.UCC Serial Shipping Container Code ("SSCC")™, the EAN.UCC Global Location Number ("GLN")™, the EAN.UCC Global Returnable Asset Identifier ("GRAI")™, the EAN.UCC Global Individual Asset Identifier ("GIAI")™, and a General Identifier ("GID")™. It is suffice to say, since these standards are well known and open to the industry, that this information provides a method to identify the tagged product by product maker/manufacturer, product model, and serial number, which we will refer to throughout the rest of this disclosure as make/model/serial-number ("MMSN"). Other standards may be employed, of course, and especially proprietary encoding and transmission schemes.

Now consider a situation of tracking multiple tagged products as they are packaged or unpackaged in and out of a shipping container (70), as shown in FIG. 7. This illustration is greatly simplified showing just two tagged products (71, 73), but in reality, a shipping container may hold many tens, hundreds, or even thousands of individually tagged products. This products can be placed into (72) the aggregating container (70), or removed from the aggregating container (70). Placing products into a container happens often during order fulfillment, when the tagged items may or many not be of identical make and model ("MM"). Filling or "packing" a container may just as well contain many items of the same MM, but each having a different serial number ("SN"), such as packing performed on production lines. Production and shipping lines may also fill containers with tagged products of different MM when packaging kits, as well.

Using RFID to monitor the inventory or contents of the container has proven difficult, in part due to the clustering of many tagged products simultaneously within range of a reader, and in part due to physical restrictions of placement of the reader with respect to paths of ingress and egress of tagged products to and from the container. For the remainder of this disclosure, we will refer to containers as physically enveloping structures, such as boxes, cartons, or trays, as well as platforms on which groups of tagged products can be packed, such as pallets.

For example, one solution from ODIN Technologies, called the ODIN Smart Container, The ODIN Smart Container, attaches an RFID reader and an active RFID tag to the container door. As items are added and removed from the container, the RFID reader tracks this information and updates its active tag which provides a dynamically maintained list of the inventory of the container. Apparently, the positioning of the reader at the door is key to determining when a tagged item is arriving or leaving the controlled space within the container. As items move through the door (e.g. within range of the RFID reader), they are first checked to see if they are on the current inventory or container manifest, and if they are not, they are added to the manifest, otherwise, if they are they are removed from the manifest. This method is sufficient for very large containers, such as Supply Line Application containers, where the items will be out of range for the RFID reader once they've passed through the door of the container. But, on much smaller containers, such as those less than 6 feet in any dimension, including many Assembly Line Application containers such as human-liftable cardboard boxes, the contained tagged products would always be in range of the reader. This renders the inventory monitoring method ineffective.

Another example is the SAVI Sentinel product, which is a battery-powered RFID reader that clamps to a standard intermodal shipping container, such as containers used for shipboard and rail transportation. The Sentinel acts as a sensor that can detect if the container has been opened, and monitors other sensors that report on the conditions and integrity of goods in the container. It also provides two-way wireless communications within a supply chain network to enable real-time auditing. It does not provide any tracking of the inventory within the monitored container, however, It is in this situation of a container which is relatively small compared to the range of the RFID system which presents a problem unsolved in the art. For example (80), in FIG. 8, a conveyor belt (81) of an assembly line, packing line, or order fulfillment line, is shown. A packed container (70) having a plurality of tagged products within it (not shown) move into range r of an RFID reader (52). If the range r is equal to or greater than the dimensions d and d' of the container (70), then many tagged products will respond nearly simultaneously as they enter the range of the reader. The faster the conveyor travel, the more prominent this problem becomes.

Therefore, there is a need in the art for a system and method to effectively monitor and track the inventory of container contents in which a plurality of RFID tagged items are stored wherein the container size is approximately equal to or smaller than the effective range of the RFID technology employed.

BRIEF DESCRIPTION OF THE DRAWINGS

The following detailed description when taken in conjunction with the figures presented herein provide a complete disclosure of the invention.

SUMMARY OF THE INVENTION

The inventors of the present invention have recognized a problem unaddressed in the art regarding use of RFID to manage inventory records of containers of RFID tagged products wherein existing systems suffer from certain limitations related to smaller containers which are of similar or less dimension than the range of an RFID reader system.

The invention may be embodied in a system, a method, a computer readable medium, or a combination of such, for tracking the contents of a container in which the items stored in the container are provided with radio frequency identification (RFID) tags, and in which a tracker affixed to the container periodically polls the items in the container to collect identification information. An electronic manifest, also attached to the container, is updated periodically to reflect items which have been added to the container or removed from the container since the last polling. The tracker emulates an RFID tag when polled by an external reader, responding by uploading the entire electronic manifest to the external reader. The external reader and the affixed reader preferably utilize distinct RFID protocols so as to produce a hierarchical manifest data structure with high integrity.

DETAILED DESCRIPTION OF THE INVENTION

Having recognized the previously-unrecognized source of the inaccuracies of existing RFID container inventory management systems, as previously discussed, the inventors have devised the following invention which is suitable for use on containers of size or dimension equal to or less than the range of the RFID reader employed.

Enhanced Container

Figure 9:
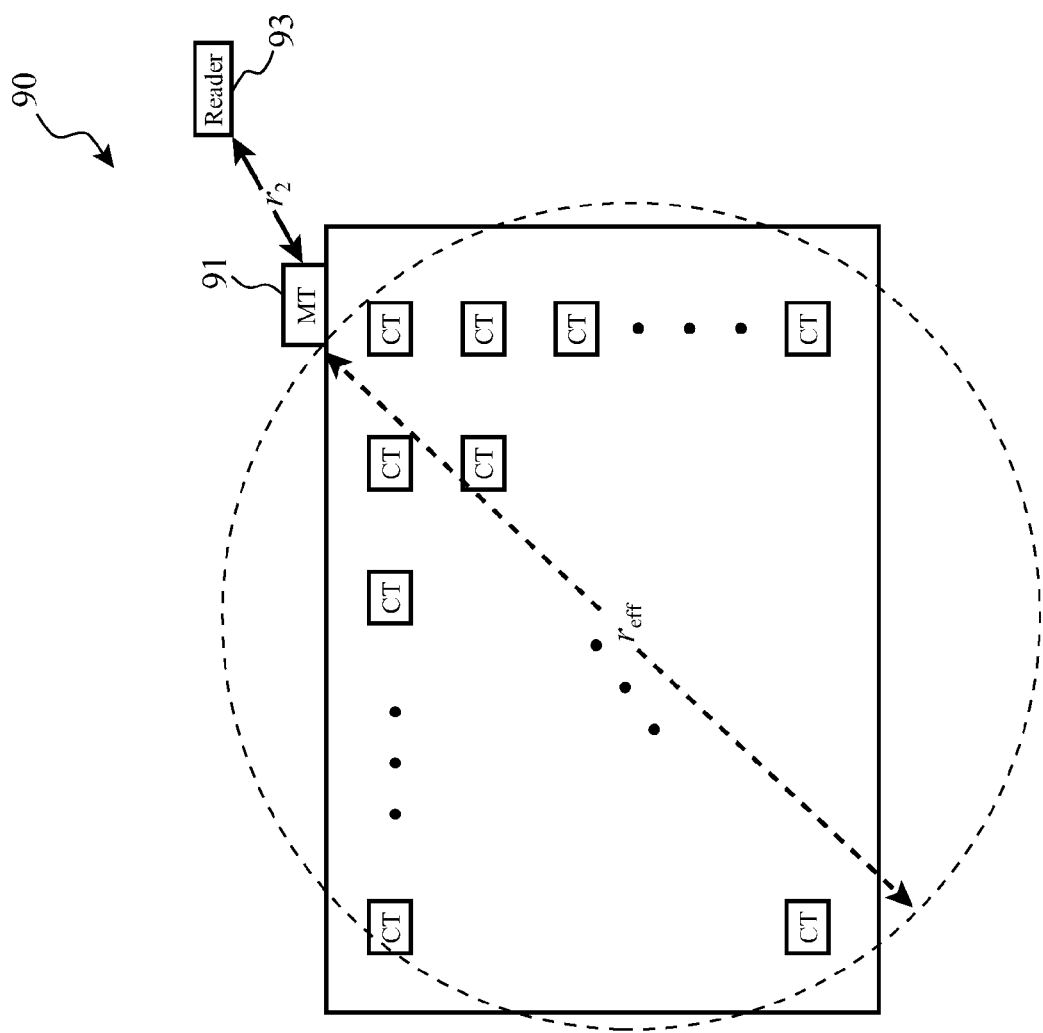
FIG. 9 illustrates an arrangement of components relative to a container according to the present invention.

Turning to FIG. 9, an arrangement (90) of components according to the present invention is shown, including a container (70) for receiving a plurality (92) of RFID tagged products, devices, packages, etc. The container (70) is equipped with a Manifest Tracker ("MT"), which is affixed to the component in a position which allows full, effective reception of the RFID tags associated with the Content Tags (92) contained within the container (70). In other words, based on the effective range $r_{eff}$ of the reader incorporated in the MT, the appropriate maximum container size and/or the appropriate position on the container is determined. For example, using the standard low frequency RFID carrier which has an effective range of approximately 6 feet, and assuming mounting the MT at a corner of cube-shaped container, a container (70) can be used having a maximum side dimension of 6 divided by the square root of 3, or approximately 3.5 feet along each side, using the well-known formula for the diagonal of a cube and where the effective range of the MT is set to be equal to (or greater than) the container's diagonal length. Rectangular containers can just as easily be accommodated using similar calculations, and alternate positions of the MT can be used to increase the size of the container usable. For example, the MT could be mounted essentially in the center of the container, such that with an effective range of 6 feet, the maximum cube-shaped container size can be extended to 7 feet, or eight times the volume of the cube with the MT mounted on a corner.

Manifest Tracker System Design

Figure 1:
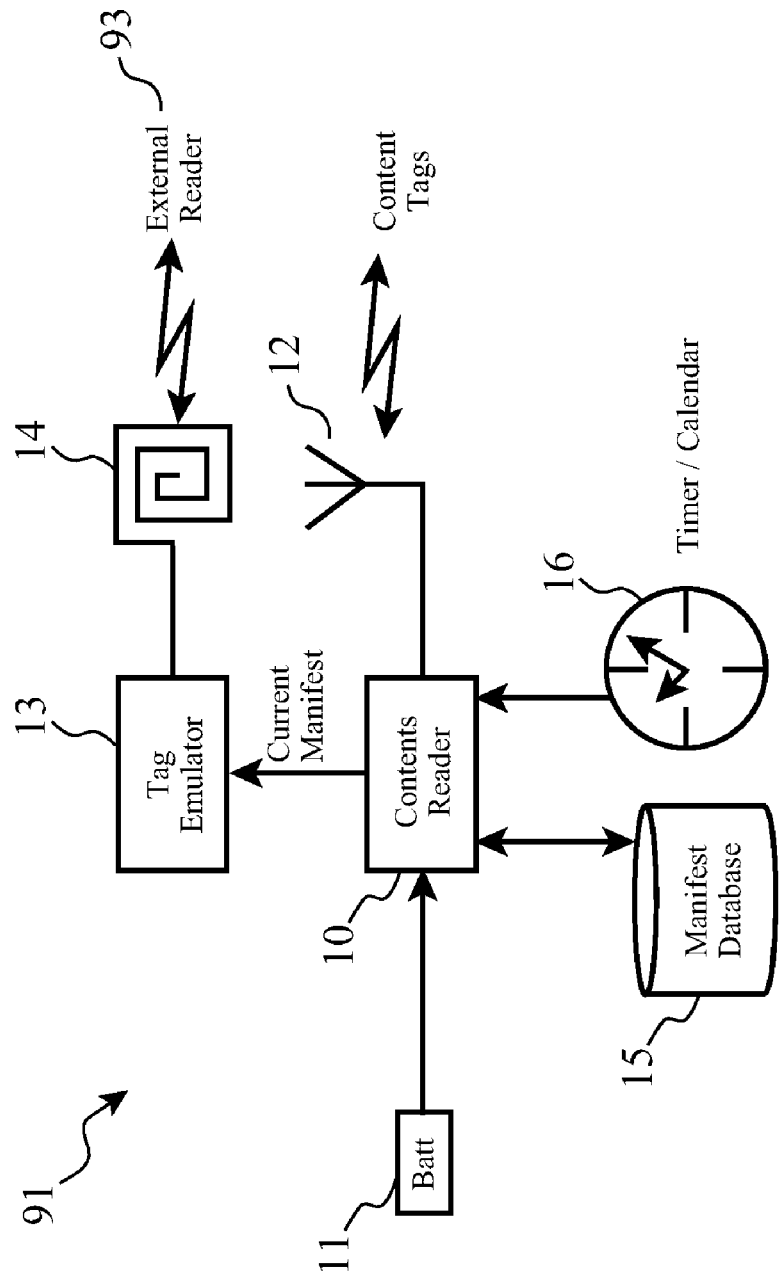
FIG. 1 depicts a system according to the present invention.

Turning to FIG. 1, more details of the functional portions of the MT (91) are shown. The MT includes an RFID tag reader (10) and antenna (12) suitable for polling the content tags to gather their information, such as MMSN data. It is also provided with a battery to allow it to operate independently over time, and a timer/calendar (16) which allows it to perform its main functions on a periodic basis. Additionally, the MT (91) is provided with an RFID tag emulator (13) and antenna (14), which is configured to receive polling or activation codes from another external reader (93), and to return information to the external reader (93) as if the MT were an RFID tag itself. The MT is provided with memory or data storage hardware (e.g. flash memory, RAM, disk, etc.) in which a master manifest database ("MMDB") is stored (15).

Preferably, the frequency or channel on which the tag emulator (13) operates is different or distinct from the frequency or channel on which the content tags and contents reader (10) operates. This will allow an external reader to poll the MT for information without causing the content tags within the container to respond to the external reader.

Hierarchical Manifest Data Management

Figure 10:
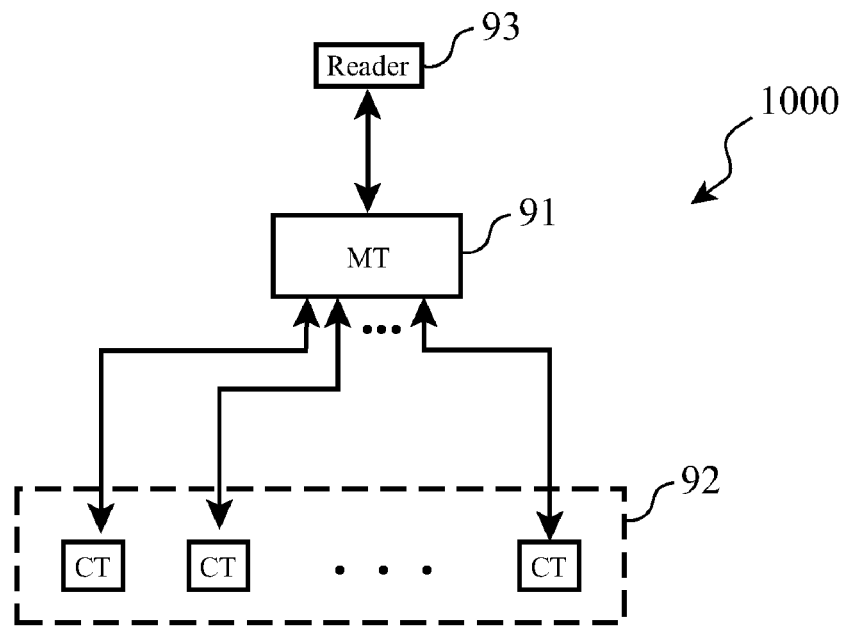
FIG. 10 shows the functional hierarchical nature of the present invention.

FIG. 10 shows the hierarchical nature (1000) of information storage and exchange performed by the invention. The external reader (93) accesses the Manifest Tracker (91) unit, which reports collected product identification information from items stored within the container to which the MT is affixed. The MT unit periodically collects all of the product identification information data from the Content Tags (92) for the items stored in the container. In this manner, the product identification information flows from the Content Tags (92) to the MT (91), and then to the external reader (93). The external reader is preferably not allowed to poll the Content Tags directly in order to maintain the orderly management of the manifest data.

Establishing Initial Manifest Database Records

Figure 11:
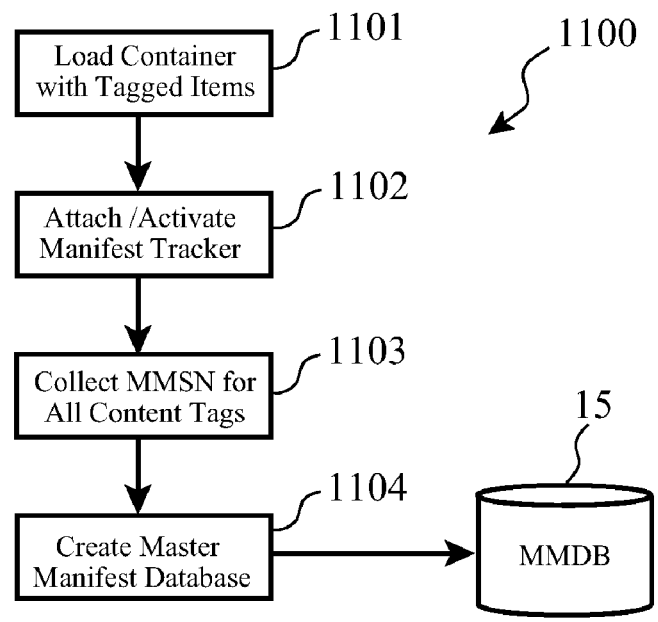
FIG. 11 sets forth a logical process according to the invention for establishing an initial master manifest for a container of RFID tagged products.

FIG. 11 shows a logical process (1100) according to the invention for establishing an initial manifest for a container. The container to which the MT is affixed is loaded or packed (1101) with a plurality of RFID tagged items, such as tagged products. The MT is then attached to the container, if not already affixed, and it is activated to send the activation code to the Content Tags associated with the items packed in the container (1102).

As the Content Tags respond by transmitting their identity information, such as MMSN codes, the MT receives and collects this information via the MT-CT RFID protocol and channel (1103). This collect identity information is then stored in a Master Manifest Database (15) in the MT, preferably using non-volatile memory or data storage.

Alternatively, the MMDB can be directly loaded by an inventory control system using a suitable data interface, such as a Universal Serial Bus ("USB") wired interface, or a short-range wireless interface such as a BlueTooth interface.

Maintenance of the Integrity of the Master Manifest

Figure 12:
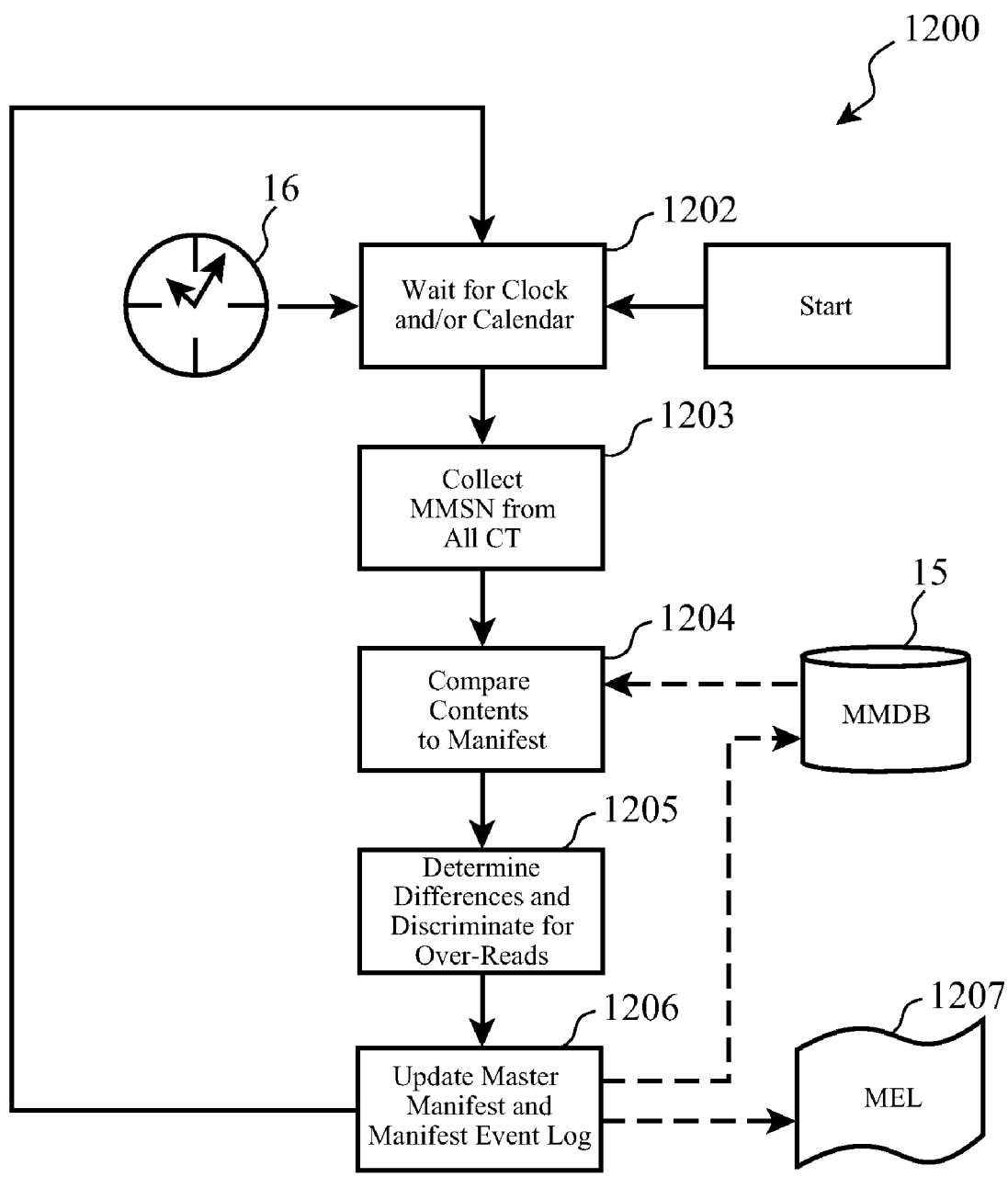
FIG. 12 sets forth a logical process according to the invention for maintaining the integrity of the master manifest for a container of RFID tagged products.

A logical process according to the invention, such as that shown (1200) in FIG. 12, is employed to maintain the integrity of the master manifest of the contents of the container. Over time, tagged items may be removed from the container, or added to the container. In order to track this movement of items automatically after the initial manifest has been established (1201), the MT periodically (1202) transmits the activation codes to trigger the RFID reporting of identification information from all of the Content Tags in the container. The responses from the CT's are collected (1203), and this up-to-date collection of identification information is compared (1204) to the current MMDB records (15).

If differences are found (1205), the MMDB is updated appropriately (1206). For example, items reporting that they are in the container but they do not appear on the MMDB, it is assumed that they have been added to the container, so the MMDB is updated to reflect their existence in the container. Likewise, items which are listed in the MMDB but fail to report to one or more MT polls are assumed to have been removed from the container, so the MMDB is updated to delete their existence.

Manifest Event Log. Because some items may fail to report due to damage to their Content Tag, or due to interference with the RFID signals themselves, a manifest event log (1207) is preferably maintained which reflects changes made to the master manifest, including time and date stamps when those changes were made. This MEL may be reported to an external reader for correlation to the master manifest, as well.

Advanced Manifest Maintenance Logic. Additional discrimination may be made to enhance the integrity of the manifest, such as the following examples.

When the enhanced, MT-equipped container is shipped with or stored near other containers containing items with compatible content tags, the MT may receive responses to those neighboring items as well as from those within the container to which the MT is affixed. This may cause those items to be added to the master manifest in error. Several logical conditions can be applied to avoid this.

First, the container may be known to be carrying only items of a certain make and model (MM). In such a case, any reports from items not having this known MM code can be ignored, and preferably their reports logged to the MEL. For example, the container may be known to be a homogenous group of laptop computers. So, make and model reports from a set of televisions could be ignored.

Second, if the container is known to be physically full when all of the items listed in the initial manifest are present, then it can be assumed that if all of those items report at a later time and additional reports from other items are received, the additional reports are to be ignored because they cannot be physically accommodated in the container. For example, assume that the container initially is completely filled with 25 laptop computers, and the 25 unique serial numbers are known in the manifest. If during a later poll by the MT, reports from all of these 25 laptop computers is received plus reports from another 8 laptop computers, it can be assumed that the other 8 laptop computers are not in the container as the container is apparently still full of the known 25 laptop computers.

Periodic Polling of Content Tags. As stated previously, there are systems which depend upon items being removed or added to a container passing within the proximity or range of a reader in order for the reader to perform inventory monitoring. This systems suffer serious limitations when the container size is of a proportion such that all items in the container are constantly within range of the monitoring reader. Other systems instead are event driven, polling for contents when the container is opened or closed, which leads to other limitations in performance and inaccuracies in the maintained inventory.

Through our process of periodic polling, and through our constructs in which the container is sized to keep all contents within range of the monitoring RFID reader, and through maintenance and logic applied to a master manifest database which travels along with the container, our system can accurately monitor the contents of the container.

Manifest Reporting

Figure 13:
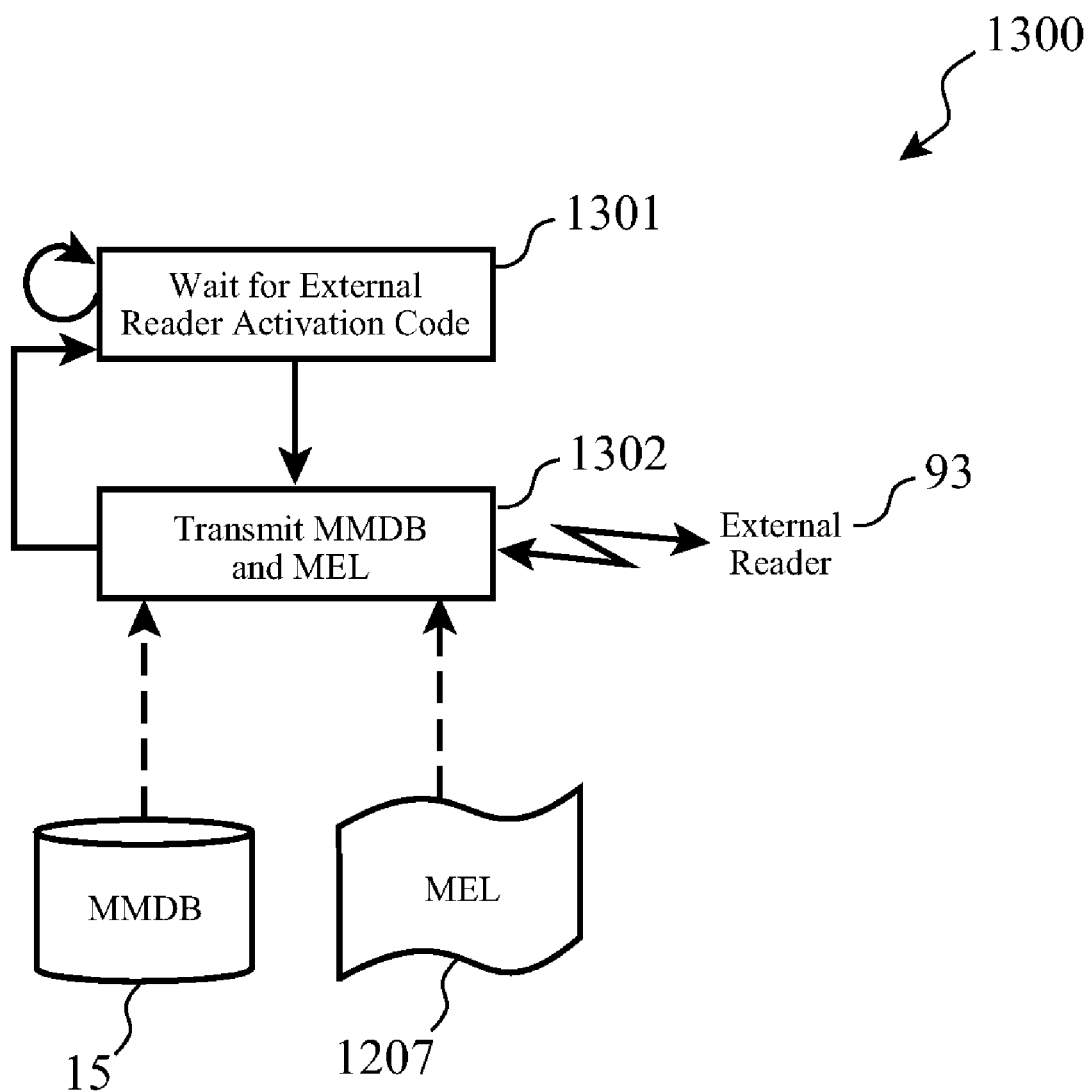
FIG. 13 sets forth a logical process according to the invention for uploading or reporting the high-integrity master manifest of a container of RFID tagged products.

FIG. 13 illustrates a logical process (1300) according to the invention in which high-integrity electronic container manifest (15) is reported to an external reader (93). The MT contains the RFID tag emulator, and as such, is constantly or continuously awaiting (1301) an activation code from an external reader. When such a code is received by the MT, the current MMDB, and preferably the MEL (1207), are transmitted (1302) to the external reader.

As stated previously, it is preferred that the RFID protocol, frequency, or channel employed between the external reader and the MT be different or distinguishable from the RFID protocol, frequency, or channel employed between the MT and the Content Tags. This provides separation between the layers of the hierarchical manifest data management, and allows for orderly control of the data reporting.

Suitable Computing Platform

In one embodiment of the invention, the functionality of the MT, including the previously described logical processes, are performed in part or wholly by software executed by a computer, such as a personal computers, web servers, web browsers, or even an appropriately capable portable computing platform, such as personal digital assistant ("PDA"), web-enabled wireless telephone, or other type of personal information management ("PIM") device.

Therefore, it is useful to review a generalized architecture of a computing platform which may span the range of implementation, from a high-end web or enterprise server platform, to a personal computer, to a portable PDA or web-enabled wireless phone.

Figure 2A:
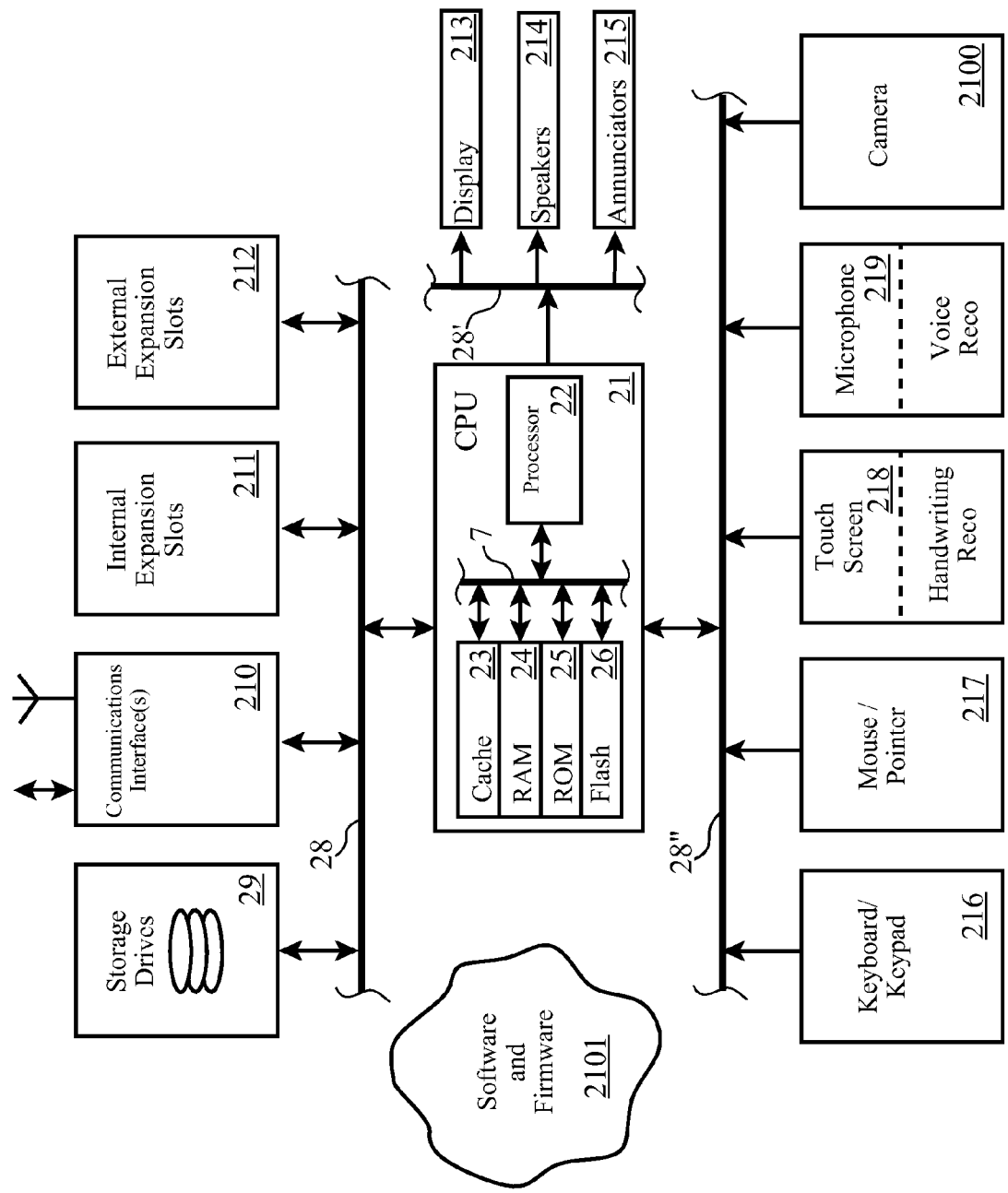
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
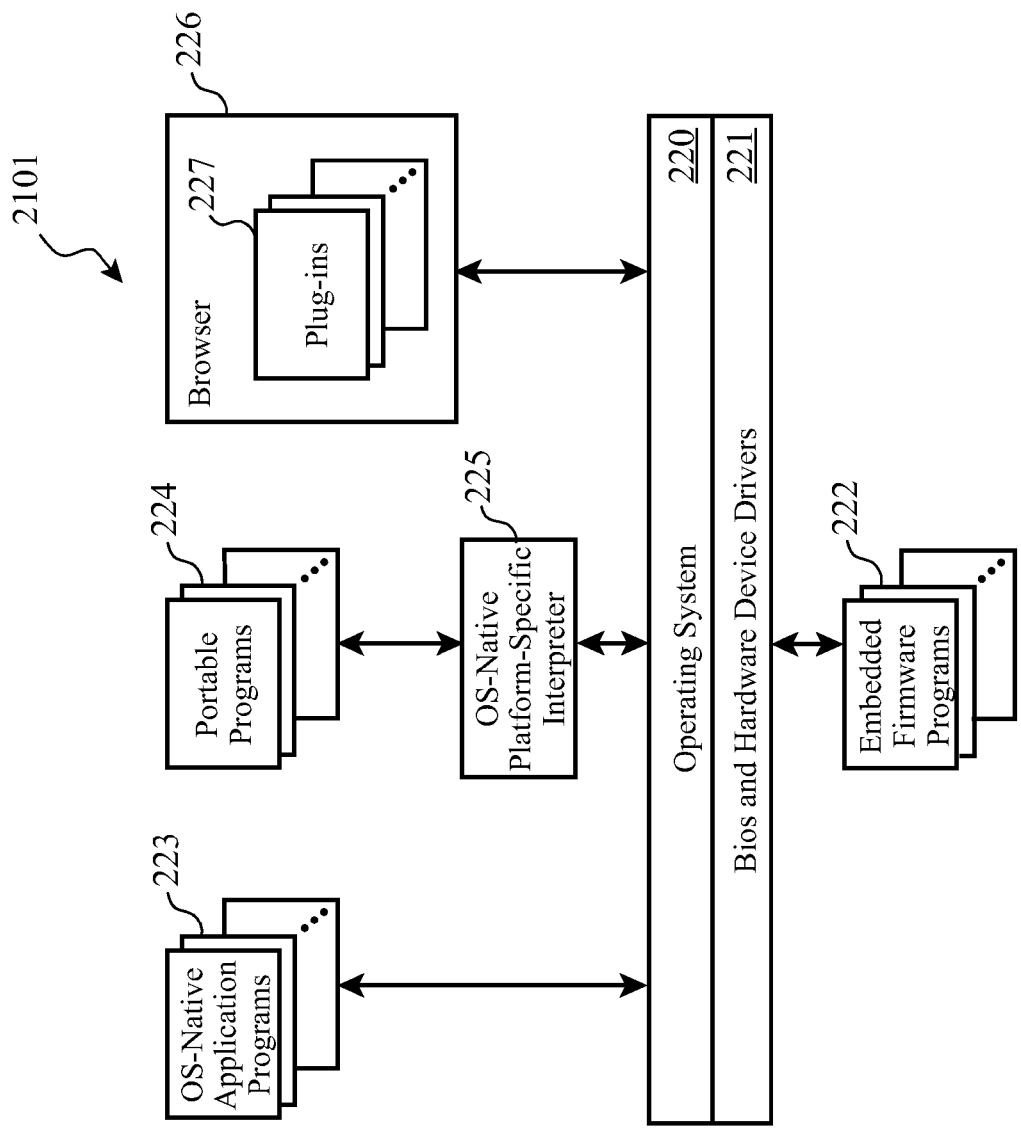

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2 ™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Service-based Embodiments

Alternative embodiments of the present invention include of some or all of the foregoing logical processes and functions of the invention being provided by configuring software, deploying software, downloading software, distributing software, or remotely serving clients in an on-demand environment.

Software Deployment Embodiment. According to one embodiment of the invention, the methods and processes of the invention are distributed or deployed as a service by a service provider to a client's computing system(s).

Figure 3A:
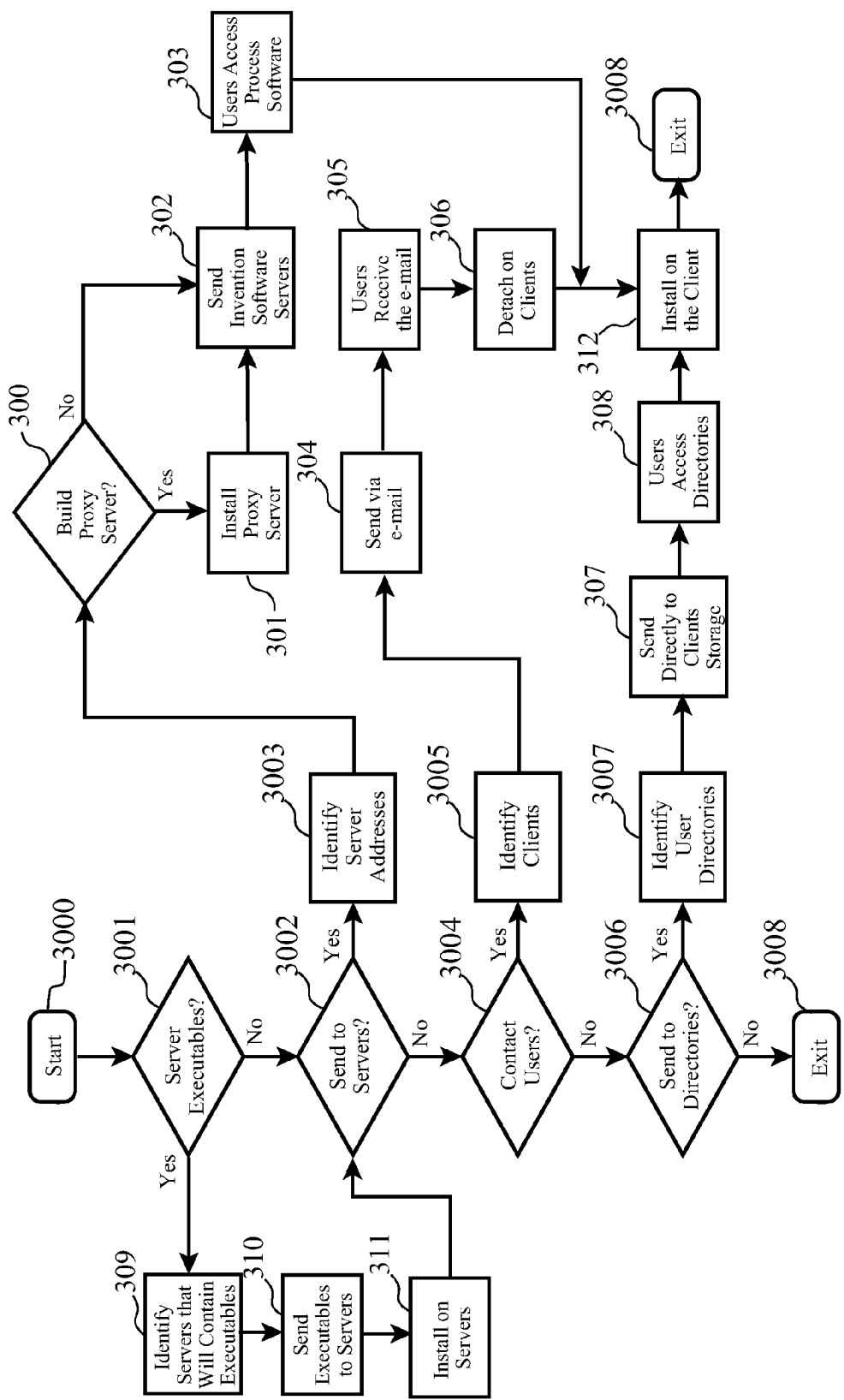
FIG. 3a sets for a logical process to deploy software to a client in which the deployed software embodies the methods and processes of the present invention.

Turning to FIG. 3a, the deployment process begins (3000) by determining (3001) if there are any programs that will reside on a server or servers when the process software is executed. If this is the case then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
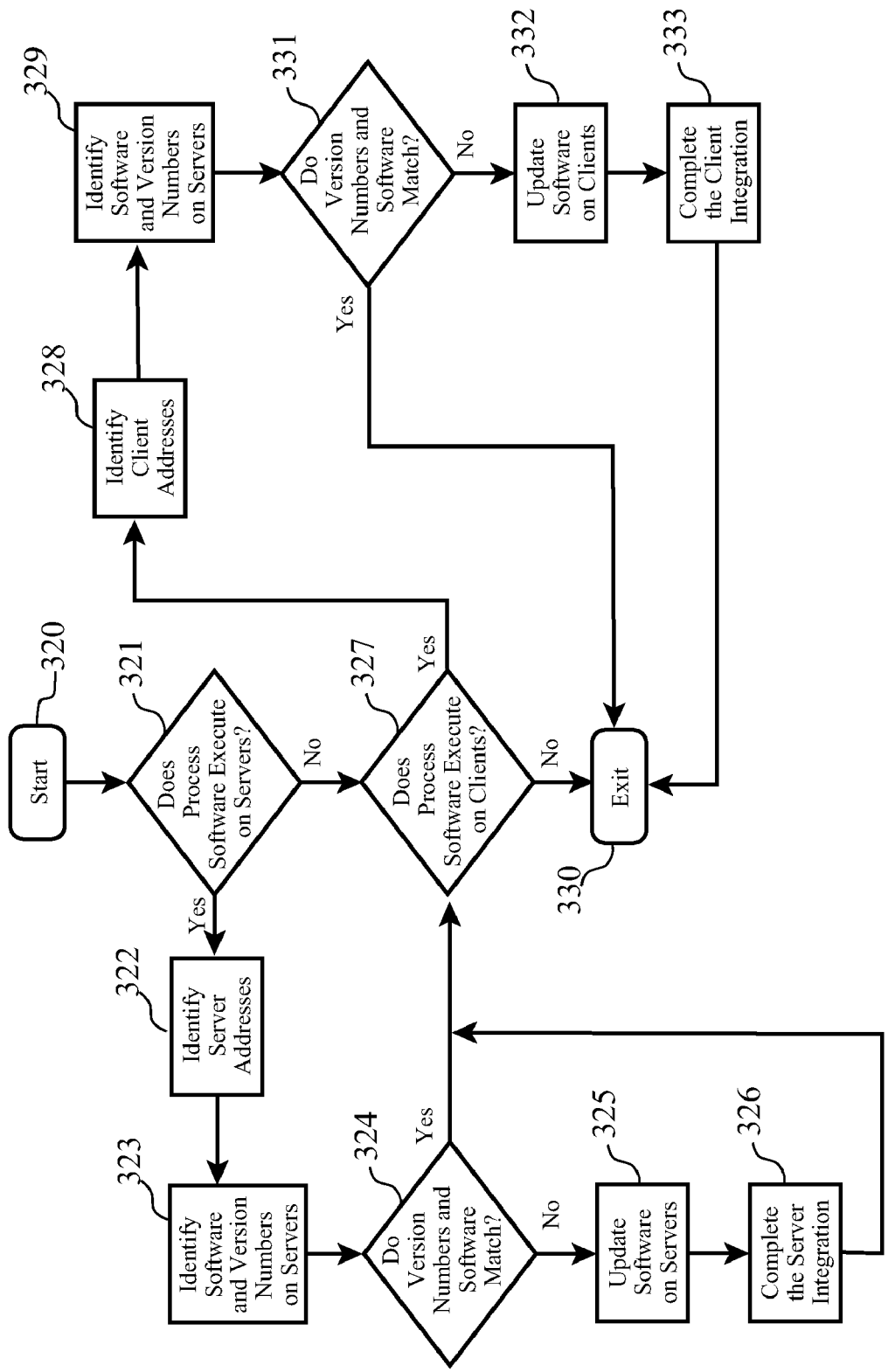
FIG. 3b sets for a logical process to integrate software to other software programs in which the integrated software embodies the methods and processes of the present invention.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match and there is no missing required software the integration continues in (327).

If one or more of the version numbers do not match, then the unmatched versions are updated on the server or servers with the correct versions (325). Additionally if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on-demand computing architecture to render service to a client by a service provider.

Figure 3C:
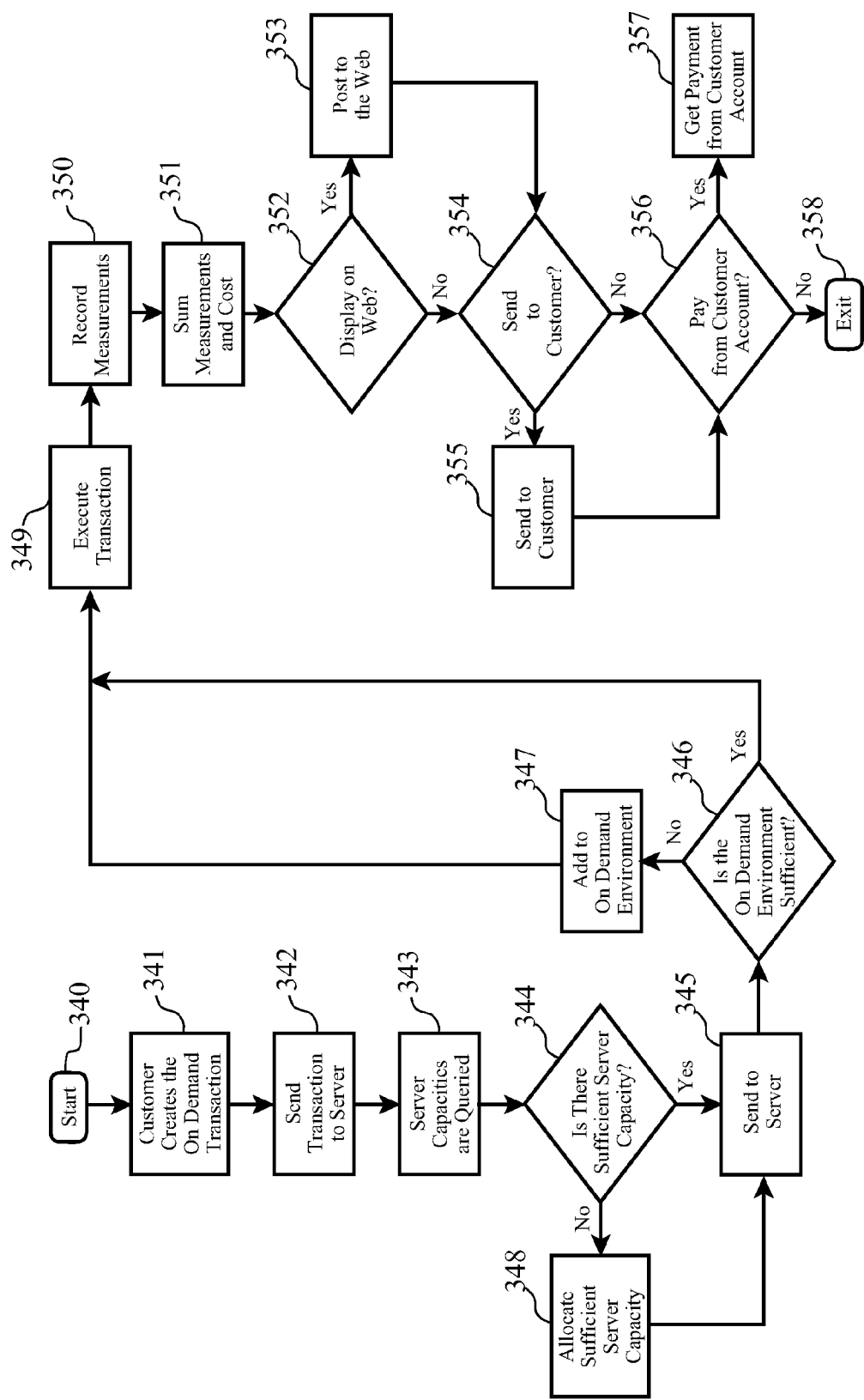
FIG. 3c sets for a logical process to execute software on behalf of a client in an on-demand computing system, in which the executed software embodies the methods and processes of the present invention.

Turning to FIG. 3c, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Grid or Parallel Processing Embodiment. According to another embodiment of the present invention, multiple computers are used to simultaneously process individual audio tracks, individual audio snippets, or a combination of both, to yield output with less delay. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
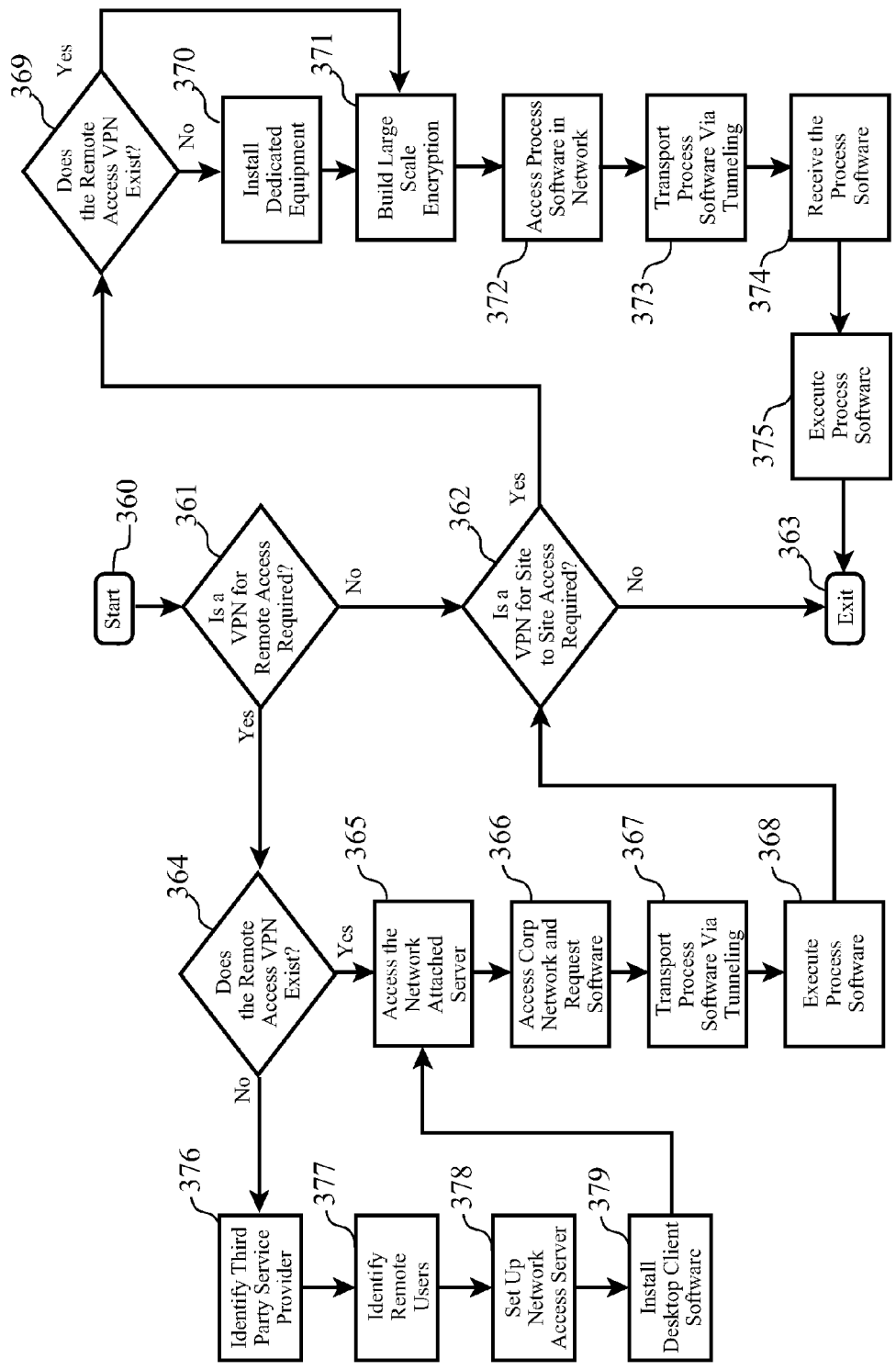
FIG. 3d sets for a logical process to deploy software to a client via a virtual private network, in which the deployed software embodies the methods and processes of the present invention.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then, build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from a the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
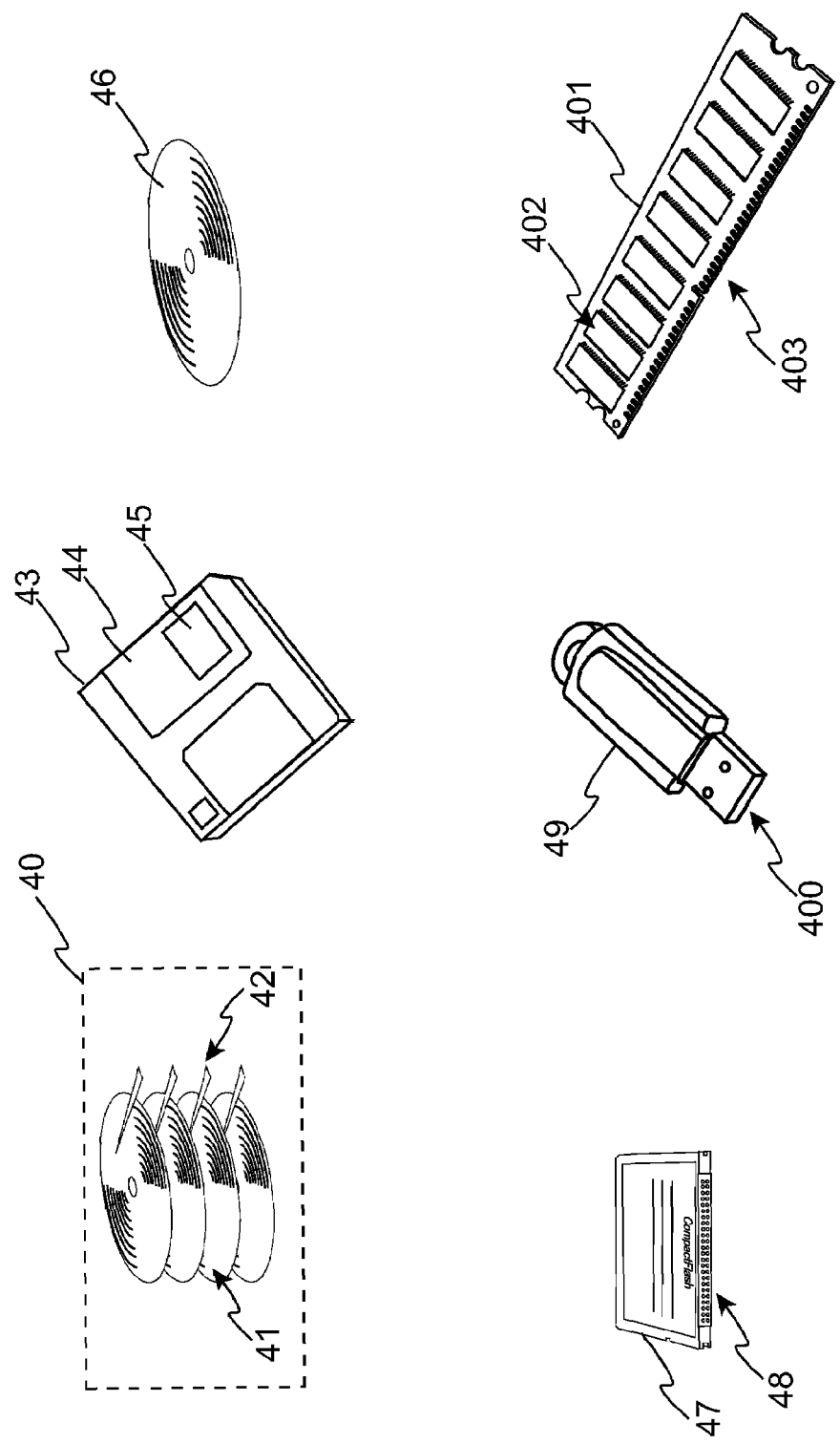
FIGS. 4a, 4b and 4c, illustrate computer readable media of various removable and fixed types, signal transceivers, and parallel-to-serial-to-parallel signal circuits.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
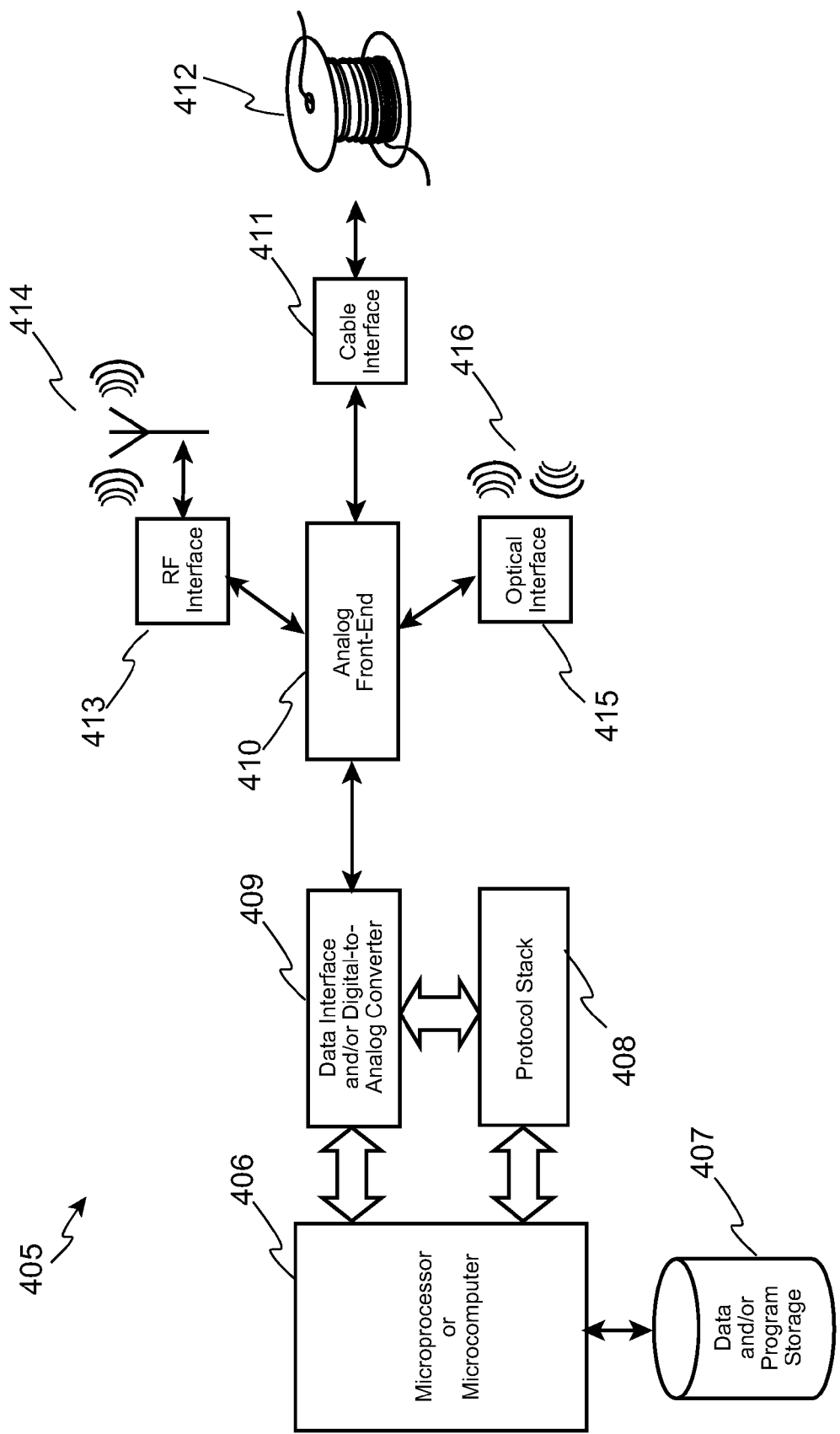

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-periperal embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
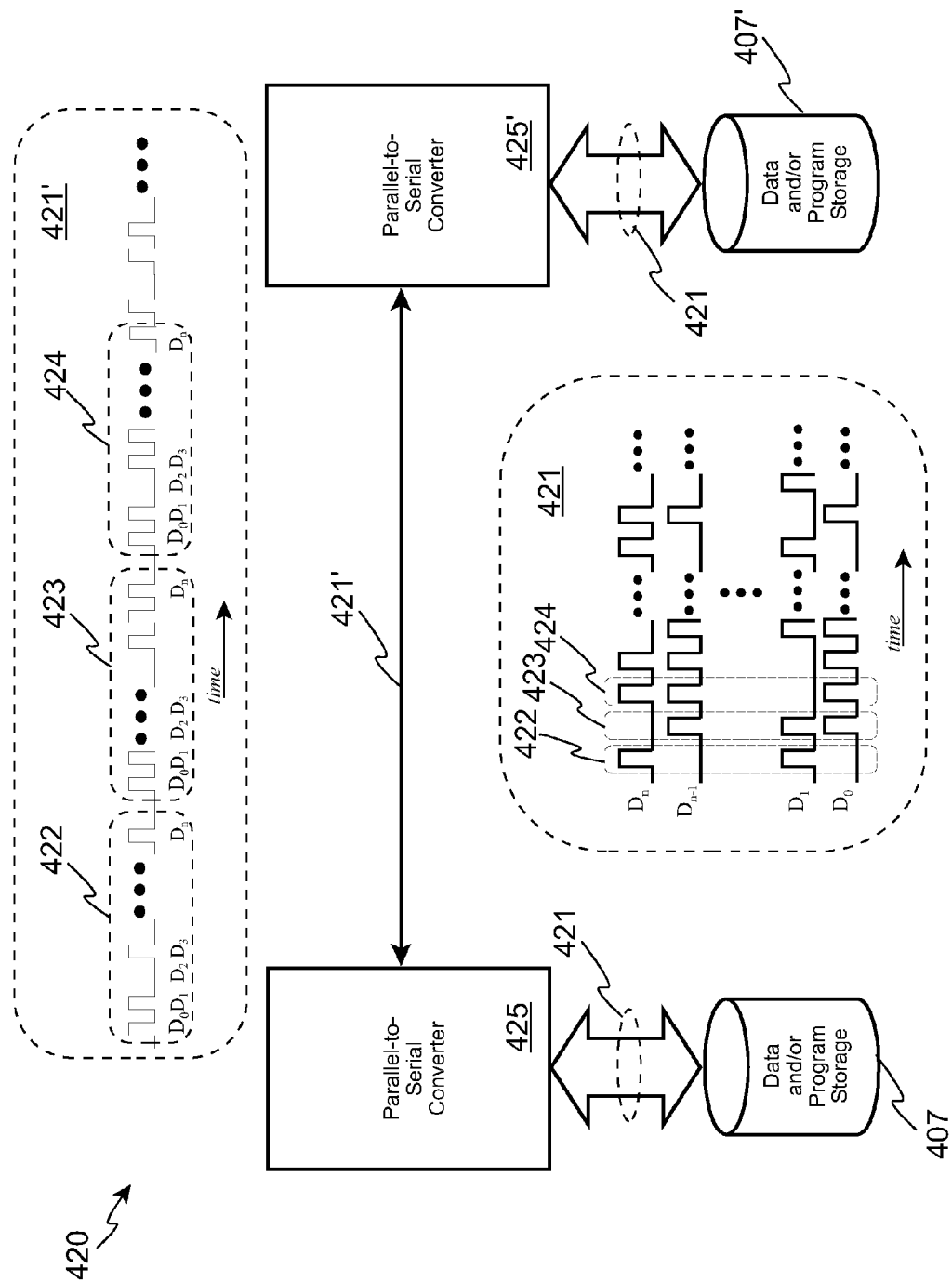
Figure 5:
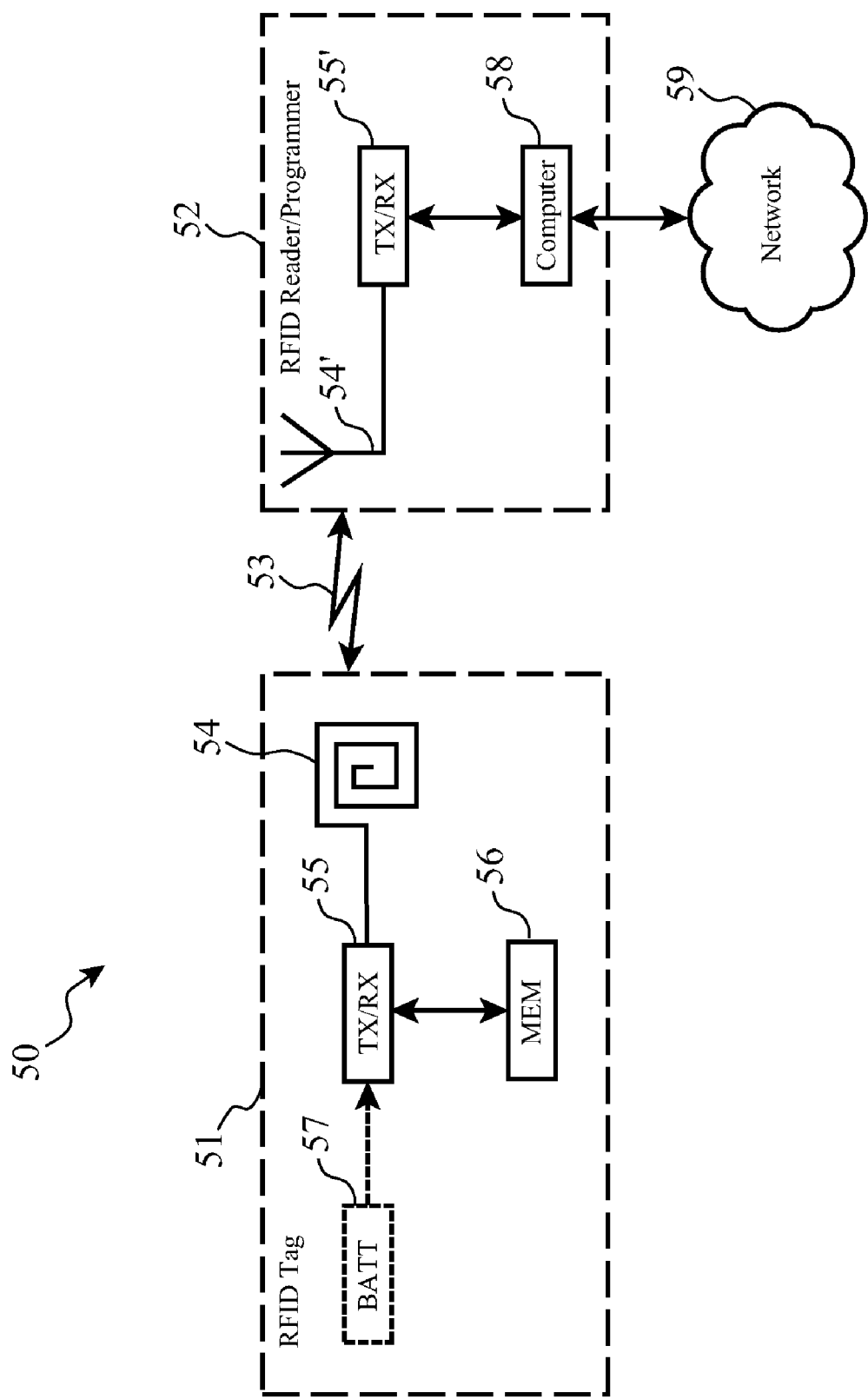
FIG. 5 illustrates a basic RFID tag and reader arrangement.
Figure 6:
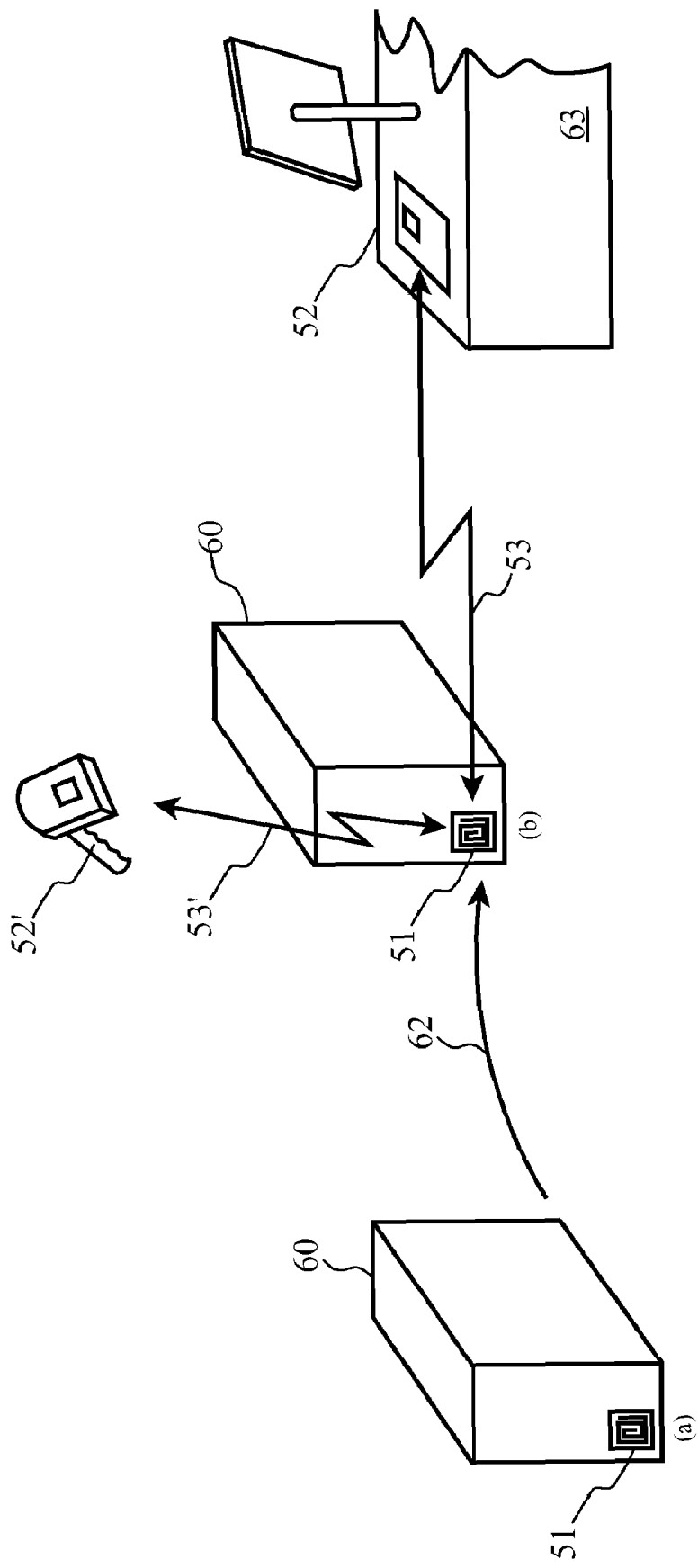
FIG. 6 provides an example of the physical proximity aspects of an RFID reader.
Figure 7:
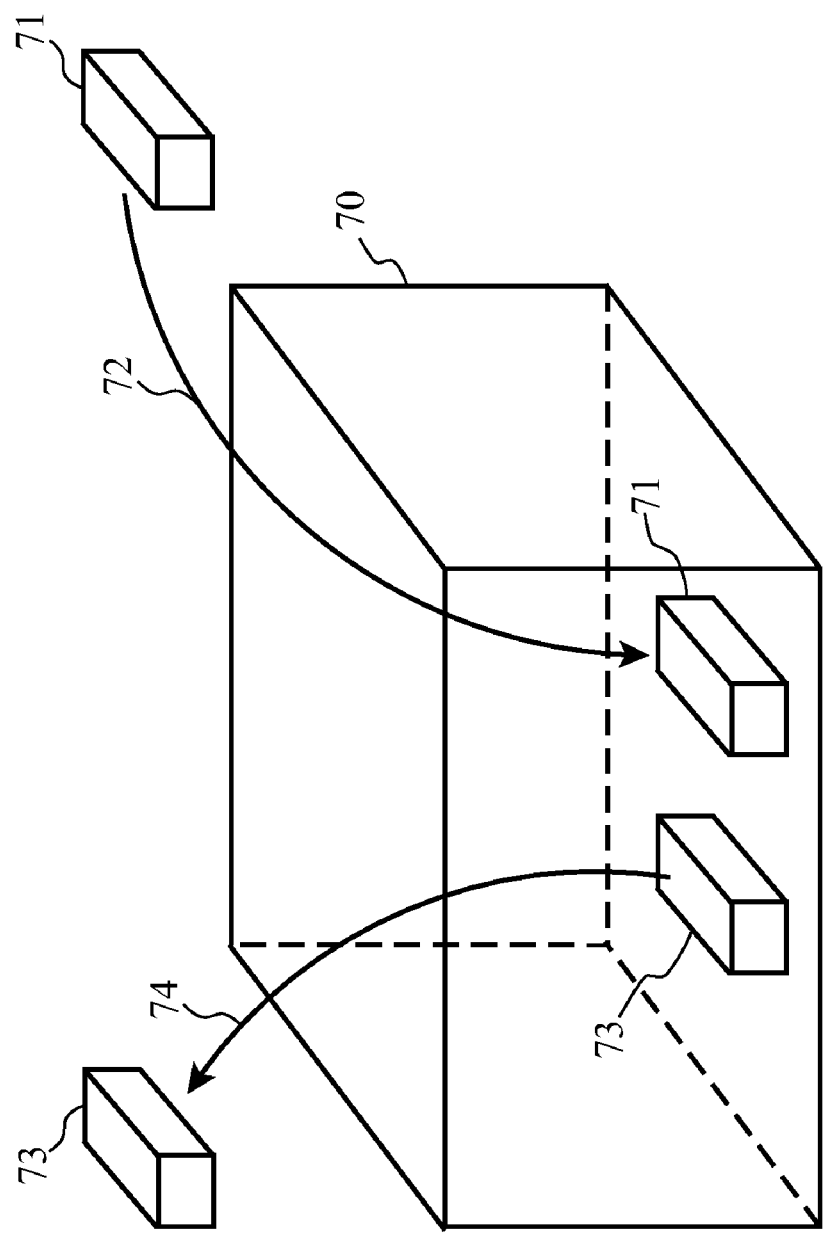
FIG. 7 shows a typical container for holding a plurality of RFID tagged products.
Figure 8:
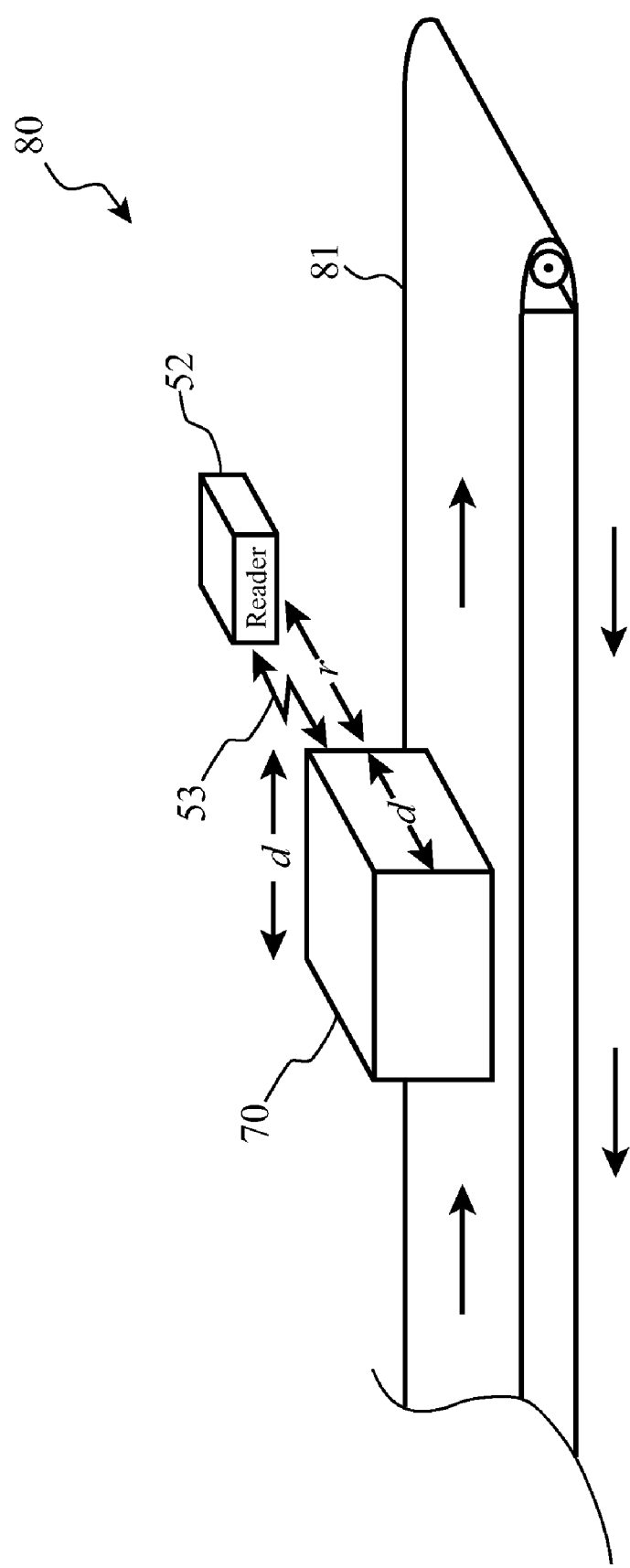
FIG. 8 shows a typical arrangement for using RFID technology to check inventory of containers passing on a conveyor belt.

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

Conclusion

While certain examples and details of a preferred embodiment have been disclosed, it will be recognized by those skilled in the are that variations in implementation such as use of different programming methodologies, computing platforms, and processing technologies, may be adopted without departing from the spirit and scope of the present invention. Therefore, the scope of the invention should be determined by the following claims.

What is claimed is:

1. A container manifest tracking system comprising:
    a radio frequency identification (RFID) contents reader affixed to a container in which a plurality of RFID tagged items are disposed, said contents reader having an effective range sufficient to reach all said tagged items, and being configured to periodically collect identification information from all of said tagged items;
    a manifest database affixed to said container, accessible by said contents reader, and storing said periodically collected information;
    a timer affixed to said container, and accessible by said contents reader to said periodic collection; and an active RFID tag emulator affixed to said container configured respond to an external reader activation code by receiving said periodically collected information stored in said manifest database and transmitting said identification information to said external reader.

2. The system as set forth in claim 1 further comprising a contents discriminator configured to apply one or more logical rules to information received from said tagged items to reduce false additions of items to said manifest database.

3. The system as set forth in claim 1 further comprising a contents discriminator configured to apply one or more logical rules to information received from said tagged items to reduce false removal of items from said manifest database.

4. The system as set forth in claim 1 further comprising a manifest event log configured to receive and store indications of changes to said manifest database from said contents reader.

5. The system as set forth in claim 1 further comprising a hierarchical data structure stored in one or more computer readable media comprising:
a set of item identifiers associated with a set of items stored in said container, each of said item identifiers being maintained by an RFID tag associated with one and only one item and reportable only to said contents tracker;
a manifest database associated with said container and modifiable only by said contents tracker and reportable only to an external reader; and
an external container inventory stored in a manner physically disassociated with said container, and maintained by an external reader.

6. The system as set forth in claim 1 wherein a first communication protocol between said contents tracker and said tagged items is distinguishable from a second communication protocol between said contents tracker and said external reader.

7. The system as set forth in claim 6 wherein said first protocol is a low-frequency RFID protocol, and wherein said second protocol is a high-frequency RFID protocol.

8. An automated method comprising:
affixing a radio frequency identification (RFID) contents reader to a container in which a plurality of RFID tagged items are disposed, said contents reader having an effective range sufficient to reach all said tagged items;
periodically collecting identification information by said content reader from all of said tagged items;
storing said periodically collected information by said contents reader in a manifest database also affixed to said container;
emulating an active RFID tag emulator affixed to said container responsive to an external reader activation code by receiving said periodically collected information stored in said manifest database and transmitting said identification information to said external reader.

9. The method as set forth in claim 8 further comprising discriminating using one or more logical rules to reduce false additions of items to said manifest database.

10. The method as set forth in claim 8 further comprising discriminating using one or more logical rules to reduce false removal of items from said manifest database.

11. The method as set forth in claim 8 further comprising storing indications of changes to said manifest database in a manifest event log.

12. The method as set forth in claim 8 further comprising producing a hierarchical data structure stored in one or more computer readable media by:
(a) associating a set of item identifiers with a set of items stored in said container, each of said item identifiers being maintained by an RFID tag associated with one and only one item and reportable only to said contents tracker;
(b) associating a manifest database with said container in a manner which is modifiable only by said contents tracker and reportable only to an external reader; and
(c) storing an external container inventory in a manner physically disassociated with said container, and maintained by an external reader.

13. An article of manufacture comprising:
a computer readable medium suitable for encoding software; and
software encoded in said medium for performing the steps of:
(a) periodically collecting identification information by a content reader from a plurality of radio frequency identification ("RFID") tagged items disposed in a container, said content reader being affixed to said container and having an effective range sufficient to reach all said tagged items;
(b) storing said periodically collected information by said contents reader in a manifest database also affixed to said container;
(c) emulating an active RFID tag emulator affixed to said container responsive to an external reader activation code by receiving said periodically collected information stored in said manifest database and transmitting said identification information to said external reader.

14. The article as set forth in claim 13 further comprising software for discriminating using one or more logical rules to reduce false additions of items to said manifest database.

15. The article as set forth in claim 13 further comprising software for discriminating using one or more logical rules to reduce false removal of items from said manifest database.

16. The article as set forth in claim 13 further comprising software for storing indications of changes to said manifest database in a manifest event log.

17. The article as set forth in claim 13 further comprising software for producing a hierarchical data structure stored in one or more computer readable media by:
(1) associating a set of item identifiers with a set of items stored in said container, each of said item identifiers being maintained by an RFID tag associated with one and only one item and reportable only to said contents tracker;
(2) associating a manifest database with said container in a manner which is modifiable only by said contents tracker and reportable only to an external reader; and
(3) storing an external container inventory in a manner physically disassociated with said container, and maintained by an external reader.

* * * * *